(12) United States Patent
Joshi et al.

(10) Patent No.: US 7,360,208 B2
(45) Date of Patent: Apr. 15, 2008

(54) ROLLING UPGRADE OF DISTRIBUTED SOFTWARE WITH AUTOMATIC COMPLETION

(75) Inventors: Sameer Joshi, San Jose, CA (US); Surojit Chatterjee, Foster City, CA (US); Jonathan Creighton, Oakland, CA (US)

(73) Assignee: Oracle International Corp., Redwood Shores, CA (US)

( * ) Notice: Subject to any disclaimer, the term of this patent is extended or adjusted under 35 U.S.C. 154(b) by 698 days.

(21) Appl. No.: 10/847,700

(22) Filed: May 17, 2004

(65) Prior Publication Data

US 2005/0267951 A1  Dec. 1, 2005

(51) Int. Cl.
*G06F 9/44* (2006.01)
*G06F 15/177* (2006.01)

(52) U.S. Cl. .................... 717/168; 709/220
(58) Field of Classification Search ............ 717/168
See application file for complete search history.

(56) References Cited

U.S. PATENT DOCUMENTS

| | | | |
|---|---|---|---|
| 6,014,669 A * | 1/2000 | Slaughter et al. ............ 707/10 |
| 6,681,390 B2 * | 1/2004 | Fiske ......................... 717/173 |
| 7,000,031 B2 * | 2/2006 | Fischer et al. .............. 709/248 |
| 7,080,371 B1 * | 7/2006 | Arnaiz et al. ............... 717/170 |
| 7,203,700 B1 * | 4/2007 | Kumar et al. ........... 707/103 R |
| 7,216,343 B2 * | 5/2007 | Das et al. ................... 717/168 |
| 2003/0078946 A1 * | 4/2003 | Costello et al. ............. 707/201 |
| 2003/0140339 A1 * | 7/2003 | Shirley et al. .............. 717/171 |
| 2003/0149970 A1 * | 8/2003 | Shanbhogue et al. ....... 717/170 |
| 2004/0015940 A1 * | 1/2004 | Heisey et al. ............... 717/168 |
| 2004/0172462 A1 * | 9/2004 | Iterum et al. ............... 709/223 |
| 2005/0257211 A1 * | 11/2005 | Chatterjee et al. ......... 717/170 |

OTHER PUBLICATIONS

Roush et al., "Cluster Rolling Upgrade using Multiple Version Support", Proceedings of the 2001 IEEE International Conference on Cluster Computing (CLUSTER '01), pp. 1-8, Oct. 8, 2001-Oct. 11, 2001.*

* cited by examiner

*Primary Examiner*—Wei Zhen
*Assistant Examiner*—Chih-Ching Chow
(74) *Attorney, Agent, or Firm*—Park, Vaughan & Fleming, LLP

(57) ABSTRACT

A system and method for facilitating an automatic rolling upgrade of distributed software. In a set of computing devices (e.g., a cluster), each node executes the distributed program, but different nodes may operate any number of different versions of the program. During a rolling upgrade of the software, the nodes all operate according to a specified acting version of the software. A node attempting the join the cluster may be required to have a software version at least equal to the acting version. When all nodes have been upgraded to a version newer than the current acting version, the acting version is reset to the lowest software version installed on a node. The rolling upgrade completes automatically when all nodes run at a specified software version (e.g., the most recent) or have the same version installed.

16 Claims, 3 Drawing Sheets

ROLLING UPGRADE OF DISTRIBUTED SOFTWARE WITH AUTOMATIC COMPLETION

BACKGROUND

This invention relates generally to the field of computer systems. More particularly, a system and method are provided for facilitating a rolling upgrade of distributed software, with automatic completion of the upgrade.

Historically, upgrades of distributed software—software executed simultaneously on multiple computer nodes—have been performed in an all-or-none manner. In other words, either no nodes are upgraded, or else all are taken out of operation, upgraded and then brought back to operation. This is typically due to the inability of the software to function with multiple different versions in operation at one time. Thus, they either all run with the old version of the software or they all run with the newer, upgrade version.

This can be unacceptable in many distributed systems. For example, when some distributed software (e.g., web services, application services, a database) is run only on a specified set of nodes, the software becomes unavailable when all nodes are down. Some organizations or enterprises cannot tolerate such unavailability. And, the more nodes there are to be upgraded, the longer the software is unavailable.

Even if the software is available when less than all nodes are operational, it is unlikely to be operational with multiple versions simultaneously in execution on different nodes. Thus, there will still be an extended period of decreased availability, as one node at a time is brought back to operation with the newer version.

SUMMARY

In one embodiment of the invention, a system and methods are provided for facilitating a rolling upgrade of distributed software from a relatively older version to a relatively newer version. In this embodiment, multiple versions of the software can operate on different nodes, and the rolling upgrade may take any amount of time to complete (e.g., hours, days, months, years).

In this embodiment, each node in a group of nodes executes the distributed program, but different nodes may operate any number of different versions of the program. During a rolling upgrade of the software, the nodes all operate according to a specified acting version of the software. A node attempting to join the cluster may be required to have a software version greater than or equal to the acting version. When all nodes have been upgraded to a version newer than the current acting version, the acting version is reset to the lowest software version installed on a node.

The rolling upgrade completes automatically when all nodes have the same or a specified software version installed (e.g., the most recent).

DETAILED DESCRIPTION

Figure 1:
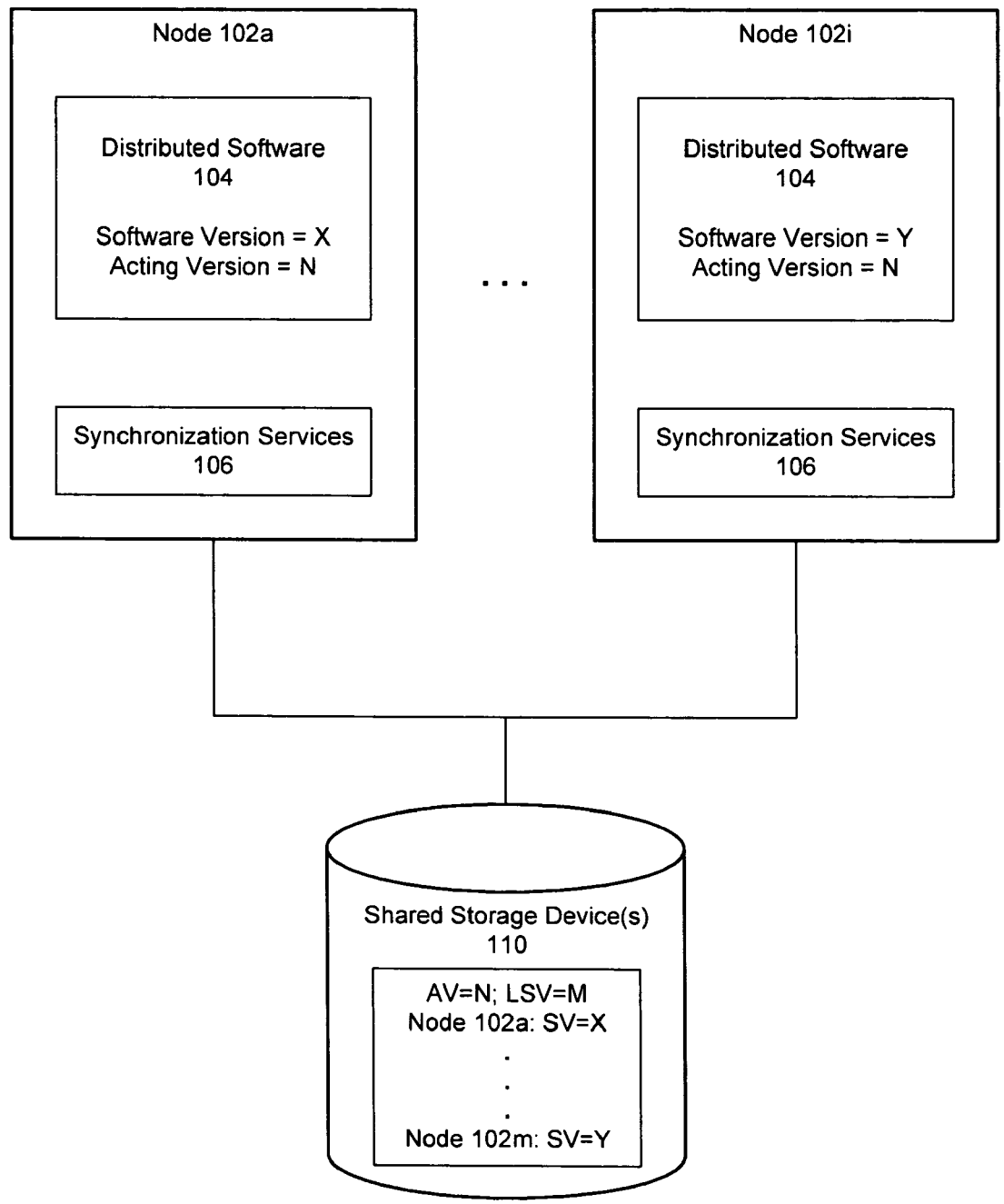
FIG. 1 depicts a block diagram of a computing environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for upgrading distributed software operating on a set of computer nodes (e.g., a cluster) from one version to another, on a rolling basis. The upgrade is a rolling upgrade in that the nodes may execute different versions of the same software simultaneously, and thus the nodes can be upgraded in any sequence, over any period of time. The upgrade may complete automatically when all nodes have been upgraded to the same version. The distributed software may comprise a web server, an application server, database software, or some other type of program.

Embodiments of the invention are described herein as they may be implemented for database or a DBMS (Database Management System) offered by Oracle® Corporation, on a cluster (e.g., a Real Application Clusters or RAC) or other set of closely cooperating computer systems. However, other embodiments of the invention may be readily derived from the following descriptions without exceeding the scope of the invention.

FIG. 1 is a block diagram of a computing environment in which an illustrative embodiment of the invention may be implemented. In this embodiment, nodes 102a-102i are computer systems or computing devices belonging to a cluster or closely coupled set of devices configured to commonly run a distributed software package. Each device in the cluster may be up or down and still remain a cluster member. In this embodiment, a "group" of devices or nodes constitutes the cluster members that are currently up. Thus, cluster membership is relatively static, while group membership is relatively dynamic.

The cluster nodes are coupled via any type of communication link(s), which may be wired or wireless, shared or dedicated. In one embodiment of the invention, the nodes are coupled via a network that may be private (e.g., an intranet) or public (e.g., the Internet) in nature.

Cluster nodes are also coupled to one or more shared devices 110, which may include storage devices (e.g., disk drives), input/output devices, etc. A node may also have one or more local or private devices that are not shared with other nodes.

Each node executes a version of distributed software 104. Any number of different versions may be executed on different nodes. At one end of the spectrum, all nodes may be executing the same version; at the other extreme, each node may be executing a version different from all other nodes.

The highest (newest) version of the software installed on a cluster node is considered that node's Software Version (SV). For example, in FIG. 1, the Software Versions of node 102a and node 102i are X and Y, respectively.

However, all group nodes operate the software at a common level, termed the Acting Version (AV). The AV of the software is a version that can be supported by each node in the cluster.

Any node whose $SV \geq AV$ (i.e., the node's software version is higher or newer than the acting version) will operate the software according to the AV, not its SV. Thus, it may continue to support functionality, data formats and other characteristics of the AV, and disable or suppress functionality provided in the SV that is not supported in the AV.

To enable different versions of the software to co-exist (e.g., to share access to a common database, to pass messages between themselves), newer versions of the software continue to support some or all of the functionality of older versions. And, multiple data and communication formats may be simultaneously supported. In particular, shared device 110 may include data generated according to formats specified in multiple versions of the software (e.g., different acting versions).

In the illustrated embodiment of the invention, the AV for software distributed among nodes in FIG. 1 is determined by the minimum SV of all nodes in the cluster, regardless of their status (i.e., up or down). Thus, until the node having the oldest or lowest SV is either upgraded to a newer SV or removed from the cluster, its SV may determine the cluster's AV. The SV parameter is individual to each node in the cluster. The AV parameter is common to all nodes in the cluster.

Another parameter, LSV (Lowest Supported Version), identifies the lowest or oldest version of the software whose functionality is supported by the SVs of the cluster members, and the oldest version of the software that can be upgraded to acting version or higher. Therefore, the LSV parameter also identifies the lowest version of the software that can be the Acting Version. In FIG. 1, the LSV is M.

A rolling upgrade of the distributed software may commence whenever a newer version of the software becomes available, or whenever the SV of any node>>AV. Until all nodes are upgraded to a particular version of the software, or to the same version, the Acting Version will trail at least one node's SV. A rolling upgrade may automatically terminate when all nodes' SV parameters are the same or the AV has been increased to a desired version of the software.

When the upgrade is complete, and whenever the AV changes, each node automatically begins operating with the functionality of the new AV, or is automatically instructed to begin operating with such functionality. For example, a different message format or protocol may be implemented, data may be stored on shared device 110 in a different format or manner, etc.

Existing data (e.g., a database) may be automatically updated to the new format. This update may be performed in real-time, offline, as resources allow, or in some other manner.

To help track each node's status, their SV parameters may be stored in a location accessible to all nodes, such as shared device 110. In a cluster environment this central repository may comprise an Oracle Cluster Registry (OCR). Access to the central repository may be limited to a single node (e.g., a cluster Master) or may be available to all or a specified subset of the nodes. The central repository may also store the current AV and LSV parameters.

Each node in the group of nodes also executes synchronization services 106 to coordinate management of the rolling upgrade. Thus, synchronization services 106 may be configured to allow nodes to publish, broadcast or exchange information such as Software Version, Acting Version, Lowest Supported Version, cluster membership, group membership, identity of a "master" node, etc. In one embodiment of the invention, in which the nodes are members of an Oracle cluster, synchronization services 106 comprises Oracle Corporation's Cluster Synchronization Services (CSS).

In another embodiment of the invention, the distributed software that may be upgraded as described herein comprises synchronization services 106.

Figure 2A:
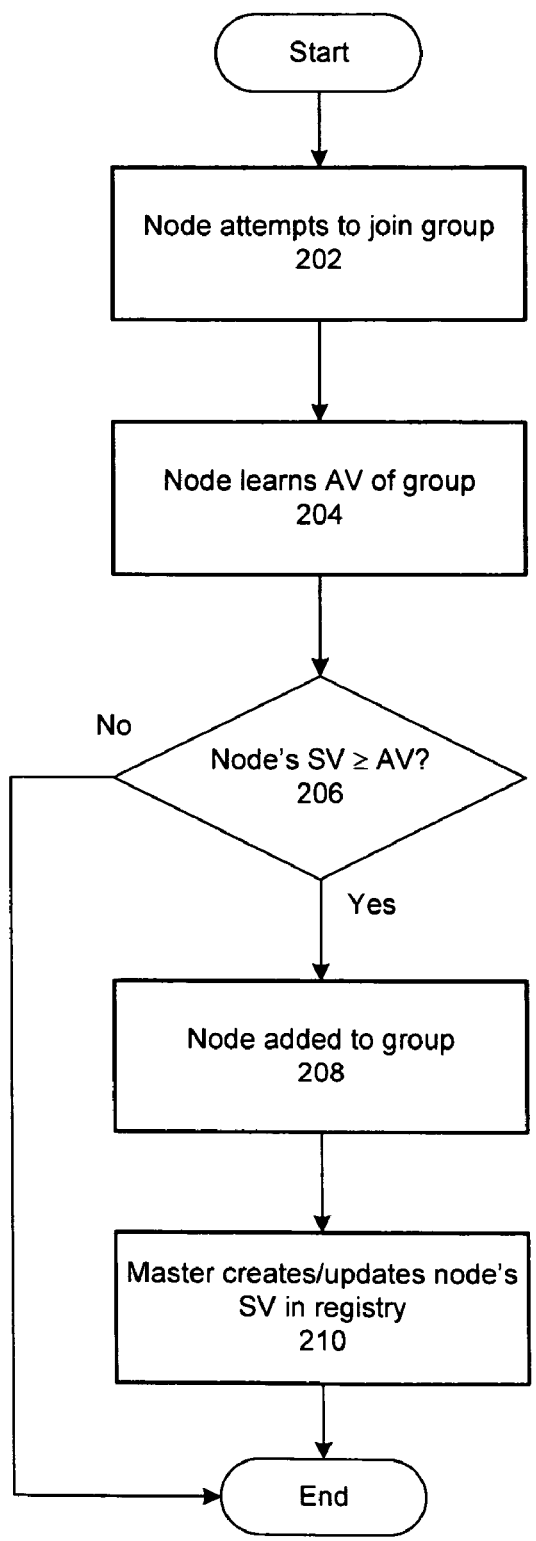
FIG. 2A is a flowchart demonstrating the addition of a node to a group of nodes operating distributed software, during a rolling upgrade, according to one embodiment of the invention.
Figure 2B:
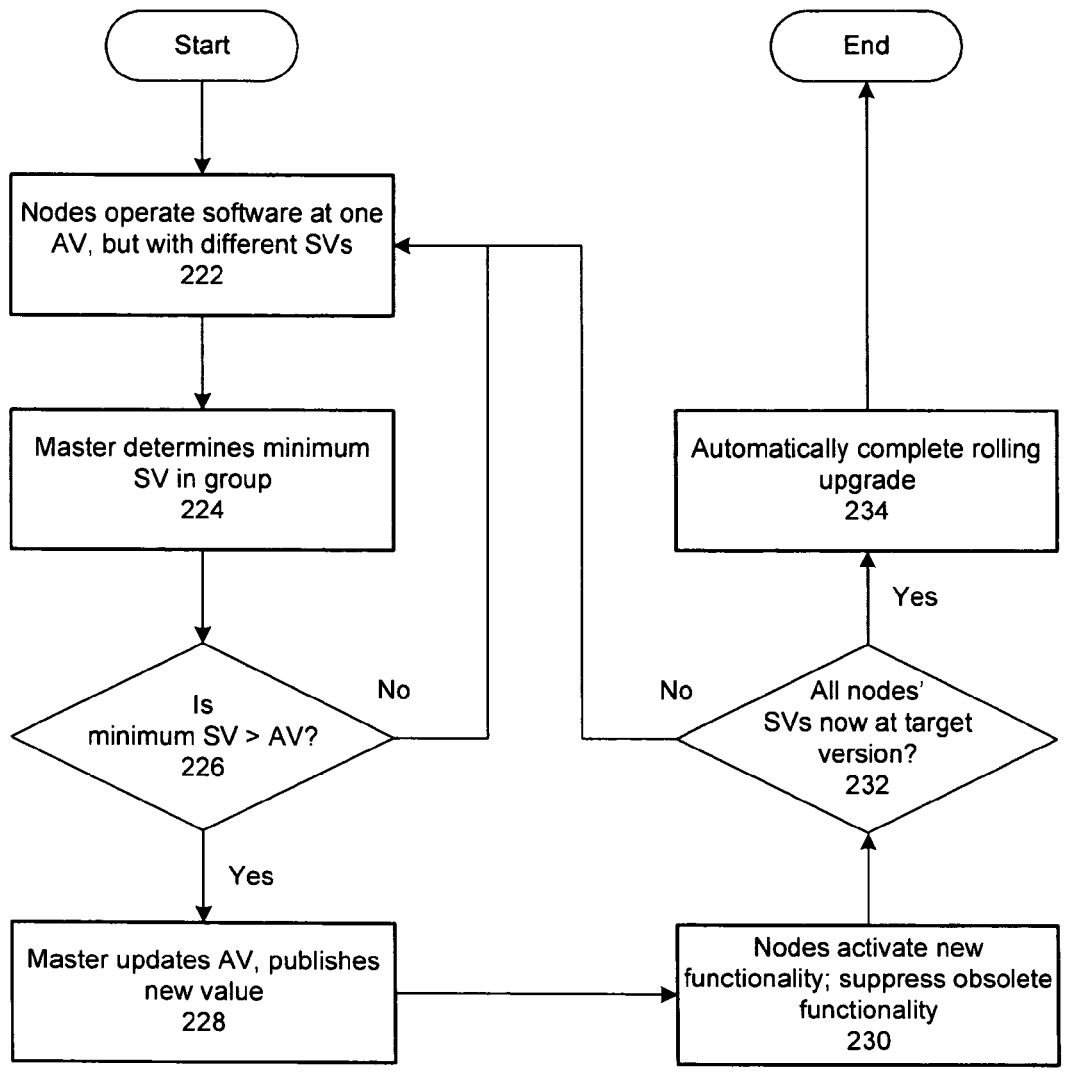
FIG. 2B is a flowchart illustrating one method of performing a rolling upgrade, with multiple versions of distributed being operated concurrently and with automatic completion of the upgrade, according to one embodiment of the invention.

FIGS. 2A and 2B are flowcharts demonstrating a method of performing a rolling upgrade of distributed software, according to one embodiment of the invention. In this embodiment, a group of computer nodes executing the software are part of a cluster (e.g., an Oracle Real Application Cluster or RAC), wherein one node is the Master node (e.g., the node that has been up for the longest period of time).

When the method commences, any number of cluster nodes (including the Master) are operating. Cluster configuration information is stored in a shared location accessible to the Master node (e.g., in an Oracle Cluster Registry or OCR).

Group membership is dynamic. Each member that is up (i.e., operating) joins the group of nodes currently running the software. They are all executing the software at the same Acting Version (AV), but any number of Software Versions (SV) may be installed on different nodes. Any number of other nodes that are normally part of the cluster may be down (i.e., not operating) for maintenance, software upgrades, or other reasons. The SV parameter of every cluster member, whether up or down, is stored in the shared storage area, and at least one node's SV is greater than AV.

FIG. 2A demonstrates a method of adding a node to the group of nodes currently running the software.

In operation 202, a node attempts to join the group of nodes currently executing the software. The node may be a known cluster member returning to operation or commencing execution of the software, or may be new to the cluster and/or the group.

In operation 204, before actually joining the group of operating nodes, the node determines the current AV and/or other applicable parameters (e.g., LSV). This may be done by querying a group member (e.g., the Master), referring to data published by the group or the Master, monitoring information (e.g., messages) broadcast by the Master or other node, etc.

In operation 206, the node's SV is compared to the group's AV. In the illustrated embodiment of the invention, the node is prohibited from joining the group if its SV<AV. If SV≧AV, the node identifies its SV to the Master node and the method continues with operation 208. Otherwise, the method ends.

In one alternative embodiment, if LSV≦SV<AV, the group's AV may be decreased or downgraded to the new node's SV so that it can join the group. This may entail the activation of older functionality, data formats, and so on, and/or the suppression of newer functionality. As another alternative, an automatic upgrade of the node's software may be commenced.

In operation 208, the node is not actually added to the group until the Master node sends a positive acknowledgement to the node.

In operation 210, the Master may compare the node's proffered SV to most recently stored SV for the node (e.g., in the cluster registry). If they do not match, the stored value is updated to identify the node's current SV. If there is no entry for the node (e.g., it is new to the cluster and the group), the master creates an entry and populates it with the node's specified SV.

In one alternative embodiment of the invention, if the node's SV does not match a stored value, the node's request to join the group may be rejected for security reasons (e.g., the node may be being spoofed). In this embodiment, part of the process of upgrading a node's version of the software is to update the cluster registry with a new SV parameter.

FIG. 2B demonstrates how the group may operate a distributed software program while facilitating a rolling upgrade of the software, according to one embodiment of the invention.

In operation 222, nodes in the group run software at a single AV, but with different SVs. During their execution of the software, they apply the data formats, message formats, protocols and functionality of the AV, regardless of their SV. Messages passed between group members may identify the AV and, possibly, the sender's SV.

A message without an AV, or with an incorrect AV, may be rejected. A node that sends messages with an incorrect AV, or that tries to operate at a different version level, may be expelled from the group.

In operation 224, the Master (or other node) determines whether the AV should be adjusted. As described above, the Acting Version may match the lowest Software Version of all nodes in the group or cluster (including nodes not currently operating). Thus, in operation 224, the master examines the stored SVs for all nodes and/or queries one or more nodes to determine their SVs.

Illustratively, the master may perform operation 224 whenever the configuration of the group or cluster changes (e.g., a node is added to the group, a node is removed from the group, a node upgrades its software).

In operation 226, if the minimum SV in the cluster is greater (newer) than the current AV, the method continues at operation 228. Otherwise, the method returns to normal execution at operation 222.

In operation 228, the Master updates the AV and publishes or broadcasts the new value.

In operation 230, each node automatically activates the functionality, data formats, protocols and other characteristics of the new AV. The nodes also suppress and stop applying any functionality that was removed in the new AV. In the illustrated embodiment of the invention, the change in functionality is applied by a node without having to reboot.

If the format of stored data (e.g., a database) changed from the old AV to the new AV, the stored data may be updated immediately or at some later time, and may be done all at once or over time. In one embodiment of the invention, multiple data and message formats are supported by the stored data (e.g., formats for all software versions≧LSV).

In operation 232, a determination is made as to whether all nodes' SVs are now at a desired (e.g., current) level. The desired level represents the software version that is the target of the rolling upgrade, and may be dynamic (e.g., it may increase over time). If all nodes are at the desired software version, the method continues at operation 234. Otherwise, normal operation of the software resumes.

In operation 234, the rolling upgrade automatically completes, without manual intervention (e.g., by a system or database administrator). The automatic completion may entail updating stored data used by the software, as described above, purging artifacts (e.g., files, registry entries or fields) of one or more older SVs not needed at the present AV, etc.

Because completion of the rolling upgrade is automatic and because multiple versions of the distributed software can coexist, the software is always available during the upgrade. There is no need to take or keep some nodes down (e.g., those that have not yet been upgraded) while others are upgraded.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of facilitating a rolling upgrade of a distributed software program executing on multiple computers, wherein a plurality of different versions of the software are installed on the multiple computers, the method comprising:
   in a shared storage area, maintaining parameter values which include:
      an acting version, a lowest supported version, a software version parameter for each of the multiple computers, and a reference to the Master node, wherein the shared storage area is accessible to each of the multiple computers;
   iteratively performing the rolling upgrade of the distributed software program executing on the multiple computers by performing:
      operating the software at the acting version on each of the multiple computers, wherein said acting version matches a lowest version of the software installed on the computers;
      designating a Master node;
      identifying a first computer which has the acting version installed;
      upgrading the software on the first computer from the acting version to a newer version;
      updating the software version parameter in the shared storage area corresponding to the first computer, wherein updating of the software version parameter is coordinated by a synchronization service executing on each of the multiple computing devices;

automatically identifying the lowest version by the Master node based on the parameter values stored in the shared storage area;

updating the acting version to the lowest version by the Master node;

automatically operating the software at the updated acting version on each of the multiple computers, wherein the update is published or broadcasted by the Master node; and automatically updating the existing data in the shared storage area to the newer format of the updated acting version;

wherein the method further comprises automatically terminating the rolling upgrade when the acting version matches the highest version of the software installed on any of the multiple computers, thereby allowing the computers to be upgraded one at a time while running the software on computers which are not being upgraded;

wherein each installed version of the distributed software has the capability to support some or all of the functionality of older versions.

2. The method of claim 1, further comprising, prior to said iteratively performing:

identifying the version of the software installed on each of the multiple computers; and selecting the lowest identified version of the software as the acting version.

3. The method of claim 2, further comprising:

repeating said identifying and said selecting:

each time a computer is added to the multiple computers; and each time a computer is removed from the multiple computers.

4. The method of claim 1, further comprising:

identifying a version of the software installed on a new computer not included in the multiple computers;

comparing said identified version to the acting version; and if said identified version matches or is newer than the acting version, adding the new computer to the multiple computers.

5. The method of claim 4, further comprising:

comparing said identified version to the lowest supported version of the software; and if said identified version is newer than or equal to the lowest supported version, adding the new computer to the multiple computers.

6. The method of claim 4, further comprising:

if said identified version is older than the acting version, downgrading the acting version.

7. A computer readable memory medium storing instructions that, when executed by a computer, cause the computer to perform a method of facilitating a rolling upgrade of a distributed software program executing on multiple computers, wherein a plurality of different versions of the software are installed on the multiple computers, the method comprising:

in a shared storage area, maintaining parameter values which include:

an acting version, a lowest supported version, a software version parameter for each of the multiple computers, and a reference to the Master node, wherein the shared storage area is accessible to each of the multiple computers;

iteratively performing the rolling upgrade of the distributed software program executing on the multiple computers by performing:

operating the software at the acting version on each of the multiple computers, wherein said acting version matches the lowest version of the software installed on the computers;

designating a Master node;

identifying a first computer which has the acting version installed;

upgrading the software on the first computer from the acting version to a newer version;

updating the software version parameter in the shared storage area corresponding to the first computer, wherein updating of the software version parameter is coordinated by a synchronization service executing on each of the multiple computing devices;

automatically identifying the lowest version by the Master node based on the parameter values stored in the shared storage area;

updating the acting version to the lowest version by the Master node;

automatically operating the software at the updated acting version on each of the multiple computers, wherein the update is published or broadcasted by the Master computing node; and automatically updating the existing data in the shared storage area to the newer format of the updated acting version;

wherein the method further comprises automatically terminating the rolling upgrade when the acting version matches the highest version of the software installed on any of the multiple computers, thereby allowing the computers to be upgraded one at a time while running the software on computers which are not being upgraded;

wherein each installed version of the distributed software has the capability to support some or all of the functionality of older versions.

8. The computer readable memory medium of claim 7, wherein the method further comprises, prior to said iteratively performing:

identifying the version of the software installed on each of the multiple computers; and selecting the lowest identified version of the software as the acting version.

9. The computer readable memory medium of claim 8, wherein the method further comprises:

repeating said identifying and said selecting:

each time a computer is added to the multiple computers; and each time a computer is removed from the multiple computers.

10. The computer readable memory medium of claim 7, wherein the method further comprises:

identifying a version of the software installed on a new computer not included in the multiple computers;

comparing said identified version to the acting version; and if said identified version matches or is newer than the acting version, adding the new computer to the multiple computers.

11. The computer readable memory medium of claim 10, wherein the method further comprises:

comparing said identified version to a lowest supported version of the software; and if said identified version is newer than or equal to the lowest supported version, adding the new computer to the multiple computers.

12. The computer readable memory medium of claim 10, wherein the method further comprises:
if said identified version is older than the acting version, downgrading the acting version.

13. A group of computing devices configured to execute distributed software, the group comprising:
multiple computing devices, each computing device comprising an installed version of the distributed software;
an acting version of the distributed software, wherein the acting version matches a lowest version of the distributed software installed on one of the multiple computing devices;
a lowest supporting version of the distributed software;
a shared storage area configured to store parameter values which include:
an acting version, a lowest supported version, a software version parameter for each of the multiple computers, and a reference to the Master node, wherein the shared storage area is accessible to each of the multiple computers; and
a Master node, wherein the Master node is configured to iteratively perform a rolling upgrade of the distributed software executing on the multiple computers by managing the following operations:
adding a first computer to the multiple computers;
updating the software version parameter in the shared storage area corresponding to the first computer;
automatically identifying the lowest version based on the parameter values stored in the shared storage area;
updating the acting version to the lowest version;
notifying to each of the multiple computers to operate the software at the updated acting version; and
automatically updating the existing data in the shared storage area to the newer format of the updated acting version;
wherein each installed version of the distributed software has the capability to support some or all of the functionality of older versions, and multiple data and communication formats may be simultaneously supported;
wherein each of the multiple computing devices executes the distributed software at said acting version regardless of said installed version; and
wherein the existing data in the shared storage area is automatically updated upon a change in the acting version to the newer format of the updated acting version.

14. The group of computing devices of claim 13, wherein said acting version is updated each time the lowest version of the distributed software installed on a computing device is upgraded.

15. The group of computing devices of claim 13, further comprising synchronization services executing on each of the multiple computing devices.

16. The group of computing devices of claim 13, wherein the multiple computing devices comprise a Real Application Cluster (RAC) and said shared storage area comprises an Oracle Cluster Registry (OCR).

* * * * *

UNITED STATES PATENT AND TRADEMARK OFFICE
CERTIFICATE OF CORRECTION

PATENT NO. : 7,360,208 B2  Page 1 of 1
APPLICATION NO. : 10/847700
DATED : April 15, 2008
INVENTOR(S) : Joshi et al.

It is certified that error appears in the above-identified patent and that said Letters Patent is hereby corrected as shown below:

In column 3, line 65, delete "node>>AV." and insert -- node>AV. --, therefor.

Signed and Sealed this

Third Day of November, 2009

David J. Kappos
*Director of the United States Patent and Trademark Office*